ered Dec. 19, 1961

3,014,080
PREPARATION OF MENTHENYL AND MENTHANYL COMPOUNDS
Joseph P. Bain and Robert L. Webb, Jacksonville, Fla., assignors to The Glidden Company, Cleveland, Ohio, a corporation of Ohio
No Drawing. Filed Apr. 4, 1955, Ser. No. 499,226
13 Claims. (Cl. 260—631)

The present invention relates to a novel method for treating 3-p-menthene, and particularly to the production of menthols and other derivatives of p-menthane oxygenated at the 3-position from 3-p-methene.

3-p-menthene is a readily available material obtainable by a number of convenient processes, such as by dehydration of dihydro-α-terpineol, followed by isomerization. It would be highly desirable, therefore, to provide a convenient process for producing menthols and other 3-oxygenated p-menthane derivatives from 3-p-menthene.

It is accordingly an object of the present invention to provide a novel process for treating 3-p-menthene.

Another object is to provide a process for converting 3-p-menthene to 3-oxygenated compounds of the p-menthane series.

A further object is to provide a novel process for producing menthols.

An additional object is to provide new compounds of the p-menthane series which are useful intermediates in the production of 3-oxygenated compounds of the p-menthane series.

Other objects will be apparent from the following description.

The process of our invention comprises chlorinating 3-p-menthene to obtain a chlorinated product consisting largely of 5-chloro-3-menthene, together with smaller amounts of 3,4-dichloro menthane and converting these products to 3-menthene-5-ol and other compounds of the 3-oxygenated p-menthane series.

The 3-menthene employed need not be highly purified if the impurities do not chlorinate as rapidly as 3-menthene, or if the chlorides of the impurities are readily separated from the 3-menthene chlorination products or from the hydrolysis products thereof. Thus, if a mixture of 2-p-menthene and 3-p-menthene is chlorinated with chlorine gas until the amount of chlorine added corresponds to the molar quantity of 3-menthene present, it will be found that the 3-menthene has been chlorinated but the 2-menthene present has not reacted appreciably and can be recovered unchanged. It is therefore evident that 3-menthene is very easily and rapidly chlorinated as compared to 2-menthene.

It is known to chlorinate hydrocarbons with various chlorinating agents. However, chlorine itself is the cheapest of these and is a very satisfactory chlorinating agent, and we prefer to employ it.

In conducting the chlorination of 3-p-menthene, we find that chlorination conditions are not critical and that good yields of 5-chloro-3-menthene are obtained when chlorine is passed into 3-menthene at room temperature or below, or above room temperature. Somewhat more 3,4-dichlormenthene is produced at lower temperatures, however, and we prefer to chlorinate at somewhat higher temperatures, suitably 90° to 120° C. if the reaction is to be conducted in the liquid phase, or at 200° C. and upwards if both reactants are to be employed in the vapor phase.

Any suitable chlorination vessel, such as a glass-lined vessel, may be employed. The reaction is exothermic, and cooling may be employed to control the temperature. The hydrogen chloride produced is permitted to escape from the reaction as formed.

In general, we prefer to pass gaseous chlorine into the 3-menthene at such a rate that the temperature can be controlled by the available cooling capacity and in total quantity corresponding to about one mole of chlorine to each mole of 3-menthene present.

While 3,4-dichloro-menthane is useful in producing 3-p-menthene-5-ol, it is much more difficult to convert than is the substitution product 5-chloro-3-p-menthene, a reactive allylic chloride.

When the chlorination step is completed, the product can be fractionated to separate any unreacted hydrocarbon from the chlorination products and the chlorination products from each other.

When compounds of the menthone-menthol family are to be produced, we have found, however, that it is convenient to subject the crude chlorinated product to hydrolysis without further purification and to isolate the desired 3-menthene-5-ol from the crude hydrolysis product. Fractional distillation of chlorides is known to require special equipment to withstand the corrosive effect of the chlorides, whereas the crude alcohol product obtained on hydrolysis of the crude chloride product is not corrosive and no special corrosion resistant equipment is required.

The crude chlorination product can be hydrolyzed by any convenient procedure. The 5-chloro-3-menthene readily hydrolyzes to 3-menthene-5-ol even under relatively mild conditions, but the dehydrochlorination-hydrolysis of 3,4-dichloro-menthane to 3-menthene-5-ol and other chlorine-free products requires much more vigorous conditions. Selective hydrolysis can be therefore applied to hydrolyze the monochloride under mild conditions to isolate the alcohol, as by fractionation, and then to hydrolyze the dichloride under more vigorous conditions.

In general, we prefer to hydrolyze the monochloride, or the crude chlorination product high in monochlorides with an aqueous slurry of lime. Hydrolysis using this system is economical and is almost complete when the reaction is conducted at 125° to 175° C. for a sufficient length of time. The time required may vary from a few hours at 175° C. to 48 hours at 125° C., but will also depend on agitation, presence or absence of emulsifiers, etc. Any unreacted chloride can be recovered and recycled to the next hydrolysis. We prefer to employ an excess of lime over that required to react. Excess unreacted lime can then be filtered or centrifuged out of the hydrolysis product, or if desired it can be dissolved by addition of a slight excess of acid, such as acetic, hydrochloric, etc. The oil phase is separated from the aqueous salts formed during the hydrolysis, and then can be washed and distilled to recover hydrocarbons, 3-menthene-5-ol and 3,4-dichlor-p-menthane. The latter product will be almost entirely unreacted if the hydrolysis conditions are mild. The dichloride can be converted to hydrocarbons, 3-menthene-5-ol and related oxygenated products by more severe or prolonged hydrolysis conditions, say at 175° to 200° C. for 24 hours or less, preferably with good agitation; see Example 5. Substantial but partial hydrolysis of the monochloride occurs easily at 100° C., or even less, but we ordinarily prefer to use an agitated autoclave for hydrolysis. Sodium hydroxide, potassium hydroxide, calcium hydroxide, sodium carbonate, calcium carbonate and certain combinations of these and with certain emulsifiers, such as soaps, can be employed in the hydrolysis. Aqueous ammonia or amines can also be used, but here some p-menthenyl amines may be produced in addition to the desired alcohol.

The amount of water employed is not critical, but in general, we prefer to employ enough water to keep the salts formed in solution when the reaction product is cooled, and we prefer not to add a great deal of water since the charge capacity of the hydrolysis vessel would be needlessly decreased. In general, the amount of water found satisfactory can be about equal to the volume of the chlorinated product.

The oil layer from the hydrolysis mixture is further suitably treated by fractionation, whereby the 3-menthene-5-ol can be secured in as pure a form as desirable. This treatment can be supplemented by freezing the alcohol, which congeals at about 15° C. when pure, to secure highest purity material, or it can be converted to the acid phthalate or other solid and easily purified material and then recovered again by hydrolysis.

Purified 3-p-menthene-5-ol readily hydrogenates to isomenthol over PtO$_2$ catalysts and at ambient temperatures and under a hydrogen pressure of 50 lbs. per square inch or less. This shows that the alcohol is largely the trans-form. Hydrogenation may be also accomplished with other catalysts, such as copper chromite or nickel. With the latter catalysts and combinations of these, it will be found desirable to use somewhat higher temperatures, up to 200° C. or even higher, and pressures up to 1000 lbs. per square inch of hydrogen, or more. Under these conditions, the isomenthol which is first formed may be equilibrated to a mixture of all four menthol isomers if the temperature is high enough and the time sufficient. In such completely equilibrated mixtures, dl-menthol predominates and can be recovered by means well known to the art.

Alternatively, 3-menthene-5-ol, even if it contains hydrogenation catalyst poisons, can be treated with a strong alkali, whereby at least partial disproportionation results and other valuable compounds are produced. For example, 3-menthene-5-ol can be treated with 5% of its weight of potassium hydroxide at around 200° C. for several hours, the product then cooled, washed with water to remove alkali and fractionated. The product contains unreacted 3-menthene-5-ol, menthol, menthone and menthenone, which can be separated by any suitable methods or the whole can be hydrogenated to mixed menthols.

Similarly, the 3-menthene-5-ol can be treated with, say 2% of its weight of sodium metal, and heated to 150–160° C. for several hours, whereby little of the unsaturated alcohol remains and the product consists of a mixture of thymol, menthone, menthenone and menthols. This product can be readily reduced with sodium in alcohol to form a mixture of menthols.

If desired, 3-menthene-5-ol can be readily oxidized by chromic acid-sulfuric acid mixture to the corresponding menthenone. The menthenone can also be prepared by Oppenauer oxidation of the alcohol.

There are therefore a number of treatments available for conversion of 3-menthene-5-ol to valuable 3-oxygenated derivatives of p-menthane, which are useful, particularly in flavors and medicinal preparations.

While we prefer to employ aqueous bases for hydrolysis of 5-chloro-3-menthene if the corresponding alcohol is desired, the chloride can also be treated with salts of organic acids, such as potassium acid phthalate, sodium acetate, etc., whereby the corresponding ester results. The esters of 3-menthene-5-ol can also be produced by esterifying the alcohol with the proper acid, anhydride, etc. by procedures well known to the art for esterifying secondary terpenic alcohols. The reaction of the chloride with the salt of the organic acid also, however, provides a method for securing the 3-menthene-5-ol in quite pure form, since the ester produced can be chosen from those which boil at much higher temperatures than the mono- or dichloride, and the pure ester recovered, which can then be readily saponified to the alcohol. Further, an ester, such as the acid phthalate, can be purified by crystallization, and also may be purified by dissolving it in an aqueous alkali and extracting from the reaction product all neutral materials, such as hydrocarbons, chlorides, etc.

5-chloro-3-menthene, a reactive allylic-type chloride, can also be easily converted to various other derivatives because of the good reactivity of the halogen atom.

Thus, treatment of the chloride with ammonia or primary and secondary amines yields the menthenyl amines.

The ethers of 3-menthene-5-ol can be prepared by heating this with an alcohol such as methyl, ethyl, ethylene glycol, etc., in the presence of an acid catalyst, such as boron fluoride or sulfuric acid. Alternatively, the ethers of 3-menthene-5-ol can be prepared by heating 5-chloro-3-menthene with the sodium derivatives of the other alcohol.

Example 1

A mixture of 40% 2-p-menthene and 60% 3-p-menthene, 665 pounds, was reacted with 204 pounds of chlorine at 65–98° C. The chlorination was carried out by bubbling chlorine into the hydrocarbon mixture at 65° C. The addition was exothermic and hydrogen chloride was evolved. The temperature was maintained at 90–98° C. by cooling the reaction vessel. When all of the chlorine had been added, the chlorination product was then cooled and recovered to yield 784 pounds.

Fractionation of a small portion of the chlorination product through an efficient glass-packed column at 10 mm. pressure gave: 34% hydrocarbons, B.P. 10 mm., 45° C.; 52% 5-chloro-3-menthene, B.P. 10 mm., 87° C., $N_D^{25}$ 1.4669, $D_4^{25}$ 0.9494; and 14% 3,4-dichloro-p-menthane, B.P. 10 mm., 104° C., $N_4^{25}$ 1.4840, $D_4^{25}$ 1.0456.

IDENTIFICATION OF COMPOUNDS

The hydrocarbon was identified as a mixture of cis- and trans-2-p-menthene by comparing its infrared spectrum with the spectra of the known compounds.

The infrared spectrum of the monochloride indicated that it contained a trisubstituted ethylenic bond, as shown by the presence of the characteristic trisubstituted ethylenic bond absorption at 12.3$\mu$. Dehydrochlorination by refluxing with 50% alcoholic KOH gave a hydrocarbon having the following properties: B.P. 10 mm., 47.5° C., $N_4^{25}$ 1.4638, $D_4^{25}$ 0.8209. The infrared spectrum of the hydrocarbon indicated the presence of a symmetrically disubstituted ethylenic bond and a trisubstituted ethylenic bond, as shown by the presence of the characteristic absorptions at 13.75$\mu$ and 12.3$\mu$, respectively.

The ultraviolet spectrum of the hydrocarbon indicated that it was a conjugate diene having an absorption peak at 260 m$\mu$ and an extinction coefficient, $$E_{1\,cm.}^{r.fl.}$$

of 31. Catalytic addition of 1 mole of hydrogen to the hydrocarbon, in the presence of 0.2% by weight of PtO$_2$ at 25–30° C. under a hydrogen pressure of 40–60 p.s.i., gave a hydrogenation product containing 45% 2-p-menthene and 55% 3-p-menthene as determined by infrared spectroanalysis.

From the above data, it is evident that dehydrochlorination of the monochloride produces 2,4,-p-menthadiene, and therefore the monochloride must be 5-chloro-3-p-menthene.

Dehydrochlorination of the dichloride by heating it with calcium hydroxide at about 175 to 200° C. gave 2,4-p-menthadiene as determined by infrared spectroanalysis. In the absence of any unlikely rearrangements, the dichloride must be 3,4-dichloro-p-menthane.

Example 2

488 pounds of the chlorination product, prepared in Example 1, was mixed with 488 pounds of water and 105 pounds of Ca(OH)$_2$. The mixture was autoclaved at 125–130° C. for 15 hours with stirring. The remaining Ca(OH)$_2$ was then dissolved by adding 53 pounds of 90% acetic acid. The oil layer, 426 pounds, was separated and dried.

The dried oil was then fractionated through an efficient column at 10 mm. pressure to yield: 35% hydrocarbon; 5% 5-chloro-3-menthene; 40% 3-menthene-5-ol, B.P. 10 mm., 92° C., $N_D^{25}$ 1.4710, $D_4^{25}$ 0.9037; and 12% 3,4-dichloro-p-menthane. There was a loss of 8% during the fractionation.

IDENTIFICATION OF COMPOUNDS

All of the above compounds except 3-p-menthene-5-ol were identified by comparison of infrared spectra with the spectra of the compounds obtained in Example 1. The spectra were identical.

The infrared spectrum of the alcohol indicated that it was a secondary alcohol, as shown by the presence of the characteristic secondary alcohol absorption at $9.5\mu$. The infrared spectrum also indicated that the alcohol contained a trisubstituted ethylenic bond, as shown by the presence of the characteristic trisubstituted ethylenic bond absorption at $12.3\mu$.

Dehydration of the alcohol by heating it with an equal weight of tartaric acid at 100–110° C. gave 2,4-p-menthadiene, whose infrared spectrum was identical with the spectrum of 2,4-p-menthadiene obtained in Example 1. The catalytic addition of hydrogen to the alcohol in the presence of $PtO_2$ and at 50 lbs. per square inch hydrogen pressure gave isomenthol which was identified by infrared spectroanalysis. The acid phthalate of the alcohol melted at 123.5° C. Malcolm and Read, J.C.S., page 1037 (1939), reported that 1-trans-3-p-menthene-5-ol on reduction gave isomenthol. The acid phthalate of 1-trans-3-p-menthene-5-ol was reported to have melted at 123° C., Zacharewicz, Roczniki Chem. 22:68–75 (1948). From the above data, it is evident that the alcohol is trans-3-p-menthene-5-ol.

Example 3

740 grams of the chlorination product of Example 1 was stirred with 1800 grams of 10% aqueous NaOH at 100–105° C. for 16 hours. The oil layer was separated and dried to give 625 grams of dried oils. Infrared spectroanalysis indicated that the reaction product was 35% 2-p-menthene, 18–20% of 5-chloro-3-p-menthene, which may also be named 3-chloro-4-p-menthene, 30–32% 3-p-menthene-5-ol and 13–15% dichlorides.

Example 4

The catalytic addition of 1 mole of hydrogen to 3-p-menthene-5-ol in the presence of 0.1% by weight of $PtO_2$ at 25–30° C. under a hydrogen pressure of 40–60 p.s.i. gave a hydrogenation product which was almost entirely isomenthol, as shown by the comparison of its infrared spectrum with the spectra of known menthols.

Example 5

500 grams of 3,4-dichloro-p-menthane, 360 grams of $Ca(OH)_2$ and 1000 grams of water were shaken in an autoclave at 175–185° C. for 15 hours. The oil layer was recovered and fractionated through an efficient glass-packed column at 10 mm. pressure. Analysis of the fractions indicated that the hydrolysis product was:

7% 2,4-p-menthadiene
7% 3,8-p-menthadiene
8% monochlorides
37% 3-p-menthene-8-ol
30% 3-p-menthene-5-ol
3% 4(8)-p-menthene-3-ol, pulegol
5% 3,4-dichloro-p-menthane, and
3% unidentified high boiling material

IDENTIFICATION OF COMPOUNDS

The 2,4-p-menthadiene was identified by comparing it with the infrared spectrum of 2,4-p-menthadiene obtained in Example 1. The spectra were identical.

The 3,8-p-menthadiene was identified by infrared and ultraviolet spectroanalysis. Its infrared spectrum showed that it contained a disubstituted terminal methylene and a trisubstituted ethylenic bond, as shown by the presence of the characteristic absorptions at $11.3\mu$ and $12.3\mu$, respectively. The ultraviolet spectrum has an absorption peak at 234 $m\mu$, indicating the double bonds are conjugate. Catalytic addition of 1 mole of hydrogen to the hydrocarbon, in the presence of 0.2% $PtO_2$ under a hydrogen pressure of 40–60 p.s.i., gave 3-p-menthene as determined by infrared spectroanalysis. The only conjugate diene having all of the above properties is 3,8-p-menthadiene, B.P. 100 mm., 116° C.

Infrared spectroanalysis of the monochlorides, B.P. 10 mm., 81° C., indicated that they were unsaturated, as shown by the presence in the infrared spectrum of the characteristic trisubstituted and tetra-substituted ethylenic bond absorptions at $12.3\mu$ and $9.3\mu$, respectively. Dehydrochlorination of the monochloride fraction, by adding it to refluxing alcoholic KOH, produced a mixture of 2,4-p-menthadiene and 2-4(8)-p-menthadiene as determined by infrared spectroanalysis. From the above data, it is evident that the monochloride fraction is a mixture of 5-chloro-3-p-menthene and 3-chloro-4(8)-p-menthene.

Infrared spectroanalysis of the low boiling alcohol fractions boiling about 90–91° C. at 10 mm. indicated that there was present a tertiary alcohol, as shown by the presence in its infrared spectrum of the characteristic tertiary alcohol absorption at $8.6\mu$. The infrared spectrum also indicated the presence of a trisubstituted ethylenic bond, as shown by the presence of the characteristic trisubstituted ethylenic bond absorption at $12.3\mu$. Catalytic hydrogenation of the unsaturated tertiary alcohol at 25–30° C. in the presence of $PtO_2$ and under a hydrogen pressure of 40–60 p.s.i. produced a saturated tertiary alcohol having an infrared spectrum identical with the spectrum of p-menthane-8-ol, obtained by hydrogenating $\alpha$-terpineol. Dehydration of the unsaturated tertiary alcohol by heating it at 150–180° C. with 0.01% $I_2$ gave 3,8-p-menthadiene as determined by infrared spectroanalysis. From the above data it is evident that the unsaturated tertiary alcohol is 3-p-menthene-8-ol.

3-p-menthene-5-ol in fractions boiling at 92–94° C. at 10 mm. was identified by comparing its infrared spectrum with the spectrum of 3-p-menthene-5-ol from Example 2. The spectra were identical.

An alcohol fraction, B.P. 10 mm., 95–97° C., was analyzed by infrared spectroanalysis and found to be 3-p-menthene-5-ol and another secondary alcohol, as shown by the relatively high intensity of the characteristic secondary alcohol absorption at $9.5\mu$ but relatively weak bands characteristic of pure 3-menthene-5-ol. Oxidation of the fraction, using $Na_2Cr_2O_7$ in $H_2SO_4$, gave 62% pulegone, as shown by comparison of its infrared spectrum with the spectrum of a known sample of pulegone obtained from oil of pennyroyal. From the above data it is evident that the other secondary alcohol is 4(8)-p-menthene-3-ol, pulegol.

The 3,4-dichloro-p-menthane was identified by comparing its infrared spectrum with the spectrum of 3,4-dichloro-p-menthane obtained in Example 1. The spectra were identical.

Example 6

154 grams of 3-menthene-5-ol, 320 grams of methanol and 0.15 gram of $H_2SO_4$ were mixed and allowed to stand at 20–30° C. for 17 hours. The reaction mixture was diluted with 500 ml. of water and the oil layer was separated. The oil layer was then washed with three 100 ml. portions of water and dried over anhydrous $Na_2SO_4$. The dried oil, 151 grams, was fractionated through an efficient column at 10 mm. pressure. Infrared spectroanalysis of the fractions indicated that the dried oil was: 8% 2,4-menthadiene, 32% unchanged 3-p-menthene-5-ol, and 60% 5-methoxy-3-p-menthene, B.P. 10 mm., 74° C., $D_4^{25}$ 0.8699, $N_D^{25}$ 1.4533.

The ethyl ether was prepared in the same manner but in a yield of about 25%, B.P. 83° C. at 10 mm.

Example 7

154 grams of 3-p-menthene-5-ol, 1.0 mole, 122 grams acetic anhydride, 1.2 moles and 3.6 grams of anhydrous sodium acetate were heated at 120–130° C. for 2 hours with stirring. The reaction product was then distilled to remove the unreacted acetic anhydride and acetic acid. When all of the excess acetic anhydride had been removed, the remaining material, 187 grams, was fractionated at 10 mm. pressure. Infrared spectroanalysis of the fractions indicated and the reaction product was 12% 2,4-p-menthadiene and 88% 3-p-menthenyl-5-acetate, B.P., 10 mm., 98.5° C., $D_4^{25}$ 0.8336, $N_D^{25}$ 1.4571.

Example 8

154 grams of 3-p-menthene-5-ol was oxidized using sodium dichromate in sulfuric acid, employing the general procedure shown in "Organic Syntheses" for conversion of menthol to menthone. The oxidation product was washed with a 10% aqueous NaOH solution and fractionated at 10 mm. pressure to yield 130 grams of a conjugate unsaturated ketone, as shown by the presence in the ultraviolet spectrum of an absorption peak at 234 mµ, $$a = E_{1\,cm.}^{\pi\,\Lambda}$$

of 40. Its semicarbazone has a melting point of 141° C. Malcolm and Read, J.C.S. 1939, page 1037, report the semicarbazone of 3-p-menthene-5-one had a melting point of 142° C. When the semicarbazone was heated with sodium methylate and diethylene glycol at 200–220° C., 3-p-menthene was recovered as determined by infrared spectroanalysis.

From the above data, it is evident that the ketone is 3-p-menthene-5-one, B.P., 10 mm., 89.5° C., $D_4^{25}$ 0.9302, $N_D^{25}$ 1.4669.

Example 9

20 grams of 3-p-menthene-5-ol and 50 ml. of 90% formic acid were shaken together for 6 hours at 20–30° C. The oil layer was washed with a 10% $Na_2CO_3$ solution and dried. The dried oil was steam distilled to yield 3-p-menthenyl-5-formate, $D_4^{25}$ 0.9524, $N_D^{25}$ 1.4629.

Example 10

Samples of 3-p-menthene-5-ol were heated with either 5% by weight of solid KOH or 2% by weight of sodium methylate at 195–205° C. for 4 hours or with 2% by weight of metallic sodium at 150–160° C. for 4 hours. The reaction products were washed with water to remove the alkali and alkali salts and dried. The dried oils were fractionated through an efficient column at 10 mm. pressure. The composition of the products was determined by infrared spectroanalysis of the fractions. The compositions resulting from the various treatments are listed below:

| Components | Metallic Sodium, percent | KOH, percent | Sodium Methylate, percent |
| --- | --- | --- | --- |
| Hydrocarbons | 10 | 5–7 | 5 |
| 3-p-menthene-5-ol | 4–6 | 55 | 76 |
| Menthone | 55 | 25–28 | 2–4 |
| 3-p-menthene-5-one | 5 | 5–7 | 5–7 |
| Menthols | 10–15 | 2 | 5 |
| Thymol | 5 | | |

A portion of the product from the treatment with metallic sodium was hydrogenated using metallic sodium and tertiary butanol. The hydrogenation product was washed with water and dried. The dried oils were fractionated at 10 mm. pressure and the fractions were analyzed by infrared spectroanalysis. The analysis indicated that the hydrogenation product had the following composition:

4–6% 3-p-menthene-5-ol
5% thymol
18% neomenthol
3–5% neoisomenthol
43–45% menthol, and
12–14% isomenthol A portion of each of the products from KOH and sodium methylate treatment was catalytically hydrogenated in the presence of 2% by weight of copper chromite at 175–185° C. under a hydrogen pressure of 1000–1200 p.s.i. The hydrogenation products were filtered and fractionated through an efficient column at 10 mm. pressure. The fractions were analyzed by infrared spectroanalysis and found to contain: 5–17% hydrocarbons, 2–4% unreduced menthone, 80–90% mixed menthols.

Example 11

500 grams of the chlorination product from Example 1 and 400 grams of potassium acid phthalate were stirred together for 4 hours at 100–110° C. The oil was then washed with water and dried. The dried oil was allowed to crystallize by keeping it at −15° C. overnight. The crystals formed were recrystallized from ethyl acetate. The purified acid phthalate, M.P. 123° C., was saponified using alcoholic KOH. Infrared spectroanalysis of the oil recovered from the saponification showed that it was 3-p-menthene-5-ol. It is evident that the above crystalline ester is the same as the 3-p-menthenyl-5-acid phthalate prepared in Example 2.

Example 12

300 grams of the chlorination product from Example 1, 150 grams of anhydrous sodium acetate and 300 ml. of acetic acid were mixed together and stirred at reflux, 115–120° C., for 3 hours. The product was washed with water and a 10% $Na_2CO_3$ solution to remove acetic acid. The washed oil was dried and fractionated in the presence of 2.0% sodium acetate. Infrared spectroanalysis of the fractions showed that the reaction product was 28% 3-p-menthenyl-5-acetate. The fractions boiling at 98–99° C. at 10 mm. pressure were high purity 3-p-menthenyl-5-acetate.

Example 13

100 grams of 5-chloro-3-menthene was added to one liter of n-butanol in which 15 grams sodium metal had been dissolved. The mixture was heated at 150° C. for 3 hours, washed with water and then fractionated. The butyl ether of 3-menthene-5-ol boiled at about 107° C. at 100 mm., $n_D^{25}$ 1.4511. It hydrogenated readily to isomenthyl butyl ether over $PtO_2$ at 50 lbs. per square inch hydrogen pressure. Its infrared spectrum was identical with that of the reaction product of sodium isomentholate and butyl bromide.

It is to be understood that the foregoing examples are illustrative and that numerous variations thereof are possible without departing from the invention. As previously indicated, other chlorinating agents than chlorine itself can be employed.

Similarly, a wide variety of alkaline materials can be employed for the hydrolysis step. When forming the 5-acyloxy compounds, the alkali metal salt of any suitable carboxylic acid can be employed. Also in the disproportionation step, any strong alkali can be used. When hydrogenation is employed, any hydrogenation catalyst can be used and the hydrogenation conditions, not being critical, can be chosen at will.

Having described the invention, what is claimed is:

1. The process for producing a p-menthane-3-ol which comprises chlorinating 3-p-menthene, by treatment with molecular chlorine to form a mixture containing a p-menthene allylic chloride and a dichloro-p-methane subjecting resulting chlorinated material to an aqueous alkaline hydrolysis, and subjecting thus hydrolyzed material to a reducing reaction to saturate carbon-carbon double bonds thereof.

2. The process for producing a p-menthane-3-ol which comprises chlorinating 3-p-menthene by treating the same with not more than about an equimolecular quantity of molecular chlorine to form a mixture containing a p-menthene allylic chloride and a dichlor-p-methane, subjecting resulting chlorinated material to an aqueous alkaline hydrolysis, and subjecting thus hydrolyzed material to a reducing reaction to saturate carbon-carbon double bonds thereof.

3. The process of claim 2 in which the reduction of hydrolyzed material is effected by catalytic hydrogenation.

4. The process of claim 2 in which the reduction of hydrolyzed material is effected by heating hydrolyzed material in the presence of strong alkali to bring about disproportionation.

5. The process of claim 2 in which the alkaline condition for the hydrolysis is brought about by an inorganic base.

6. The process of claim 2 in which the alkaline condition for the hydrolysis is brought about by an alkali metal salt of a carboxylic acid.

7. The process for producing 3-p-menthene-5-ol which comprises chlorinating 3-p-menthene by treating the same with not more than about an equimolecular quantity of molecular chlorine to form a mixture containing a p-menthene allylic chloride and a dichlor-p-menthane and subjecting resulting chlorinated material to an aqueous alkaline hydrolysis.

8. The process for producing 3-p-menthene-5-ol which comprises chlorinating 3-p-menthene by treating the same with not more than about an equimolecular quantity of molecular chlorine to form a mixture containing a p-menthene allylic chloride and a dichlor-p-menthane, and hydrolyzing resulting chlorinated material by heating the same with an inorganic base in an aqueous medium.

9. The process of claim 7 in which the alkaline condition for the hydrolysis is brought about by an alkali metal salt of a carboxylic acid.

10. The process which comprises heating 3-p-menthene-5-ol with a strong inorganic alkaline material to bring about disproportionation and a concomitant reduction in the degree of unsaturation.

11. The process of claim 10 in which the alkali material is an alkali metal hydroxide.

12. The process of claim 10 in which the alkaline material is an alkali metal.

13. The process of claim 10 in which the alkaline material is an alkali metal alcoholate.

References Cited in the file of this patent

UNITED STATES PATENTS

| 2,361,532 | Cox | Oct. 31, 1944 |

FOREIGN PATENTS

| 376,356 | Great Britain | July 11, 1932 |
| 532,614 | Great Britain | Jan. 28, 1941 |
| 569,843 | Germany | Feb. 8, 1933 |

OTHER REFERENCES

Simonsen: "The Terpenes," Vol. I, pages 261–2 (1947).

Rodd: "Chemistry of Carbon Compounds," Vol. IIB, Elsevier, N.Y., 1953; pp. 520, 521.